Oct. 22, 1935.  F. FERRAL  2,017,961
FLUID CURRENT MOTOR
Original Filed Oct. 6, 1931
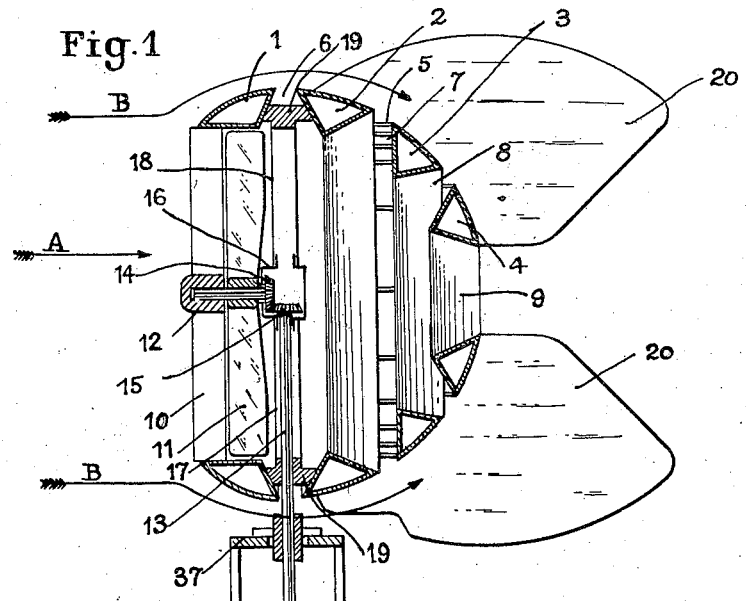
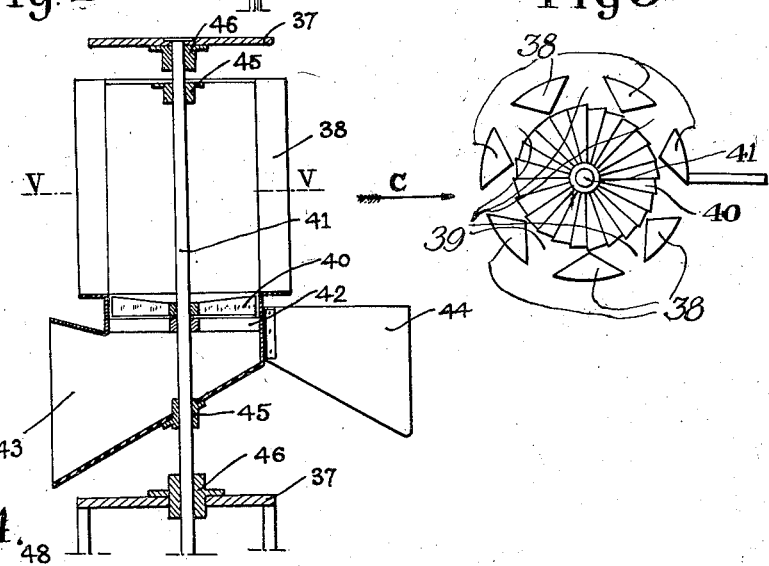
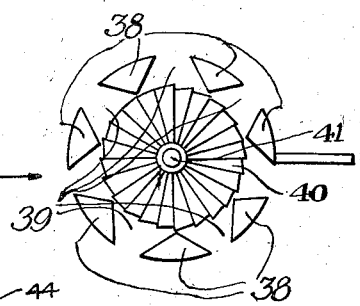
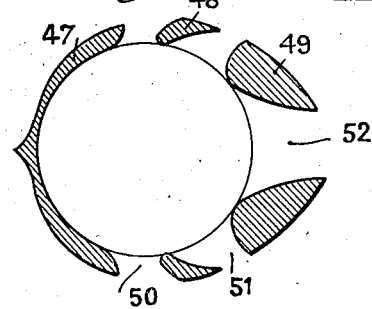
Inventor:
F. Ferral Patented Oct. 22, 1935

2,017,961

UNITED STATES PATENT OFFICE 2,017,961

FLUID CURRENT MOTOR

Frédéric Ferral, Paris, France

Application October 6, 1931, Serial No. 567,266.
Renewed June 21, 1935. In France September
1, 1931

3 Claims. (Cl. 170—5)

My invention relates to a motor which operates under the impulse of a fluid stream which may or may not be elastic.

In most of the motors which use as a power source the speed of a current or stream of a fluid, as for instance wind motors which are actuated by a displacement of air, such motors use only the direct action produced by the stream of fluid upon a rotating blade wheel or turbine. In such motors the power transformed is only that contained in the moving air under the character of a live force. Such apparatuses have only a very small efficiency because they produce eddies in the stream of wind in which they are located. On the other hand they require a rather high head rapid stream for their starting, and their cumbersome form contributes materially to their cost.

The wind motor according to my invention, which remedies the above drawbacks, comprises in combination with a movable member such as a turbine wheel which may or may not be provided with a fixed distributing valve, a suction device constituted for instance of circular or annular boxes of rectilinear or any other convenient shape, and preferably having an external appearance of a body of revolution and comprising eventually internal nozzles which converge towards the periphery, the turbine being either arranged inside the exhaust or sucking device or being located in a room which is either directly or indirectly connected with the internal part of such exhausting device, with the purpose of using upon said turbine the action of the displacement of fluid caused by the lowering of pressure provided in the exhaust device when the same is located in a stream of a fluid.

In the accompanying drawing which shows by way of example a constructional form of a preferred embodiment of a wind motor according to my invention:—

Fig. 1 is a side view, partly in section of a preferred embodiment of the motor.

Fig. 2 is a vertical section through a modified construction.

Fig. 3 is a section along the line V—V of Fig. 2.

Fig. 4 is a section showing another constructional form of exhausting device.

The motor according to my invention comprises, in the embodiment shown in Fig. 1, an exhauster or sucker constituted by boxes 1, 2, 3 and 4 preferably constructed of sheet metal having the shape of tores of revolution triangular in cross section. Such boxes are connected together by means of spacing pieces 5 so as to have an external spherical shape, and providing between themselves internal circular nozzles 6, 7, 8 and 9 which converge towards the periphery. Mounted in the front of such exhauster is a stationary distributing wheel 10 which is provided with paddles or blades in any convenient number and behind such stationary wheel is located a rotating wheel 11 provided with shaft 12, said wheel 11 having preferably the same number of paddles as the directing wheel 10. The movement of the rotating wheel is transmitted to a vertical shaft 13 by means of any convenient transmission for instance by means of bevel gears 14, 15, which are rotating in a casing 16 carried by tubes 17, 18 secured to the boxes 1, 2, for instance by means of brackets 19.

The general casing which has thus a spherical shape is provided with two external rudders 20 which secure the convenient orientation of the exhauster according to the direction of the current or stream of fluid in which it is located.

The operation is as follows:—

Assuming that the motor is located in a stream of fluid the direction of which is indicated by the arrow A (Fig. 1) the fluid when striking the paddles or blades of the rotating wheel 11, causes the same to rotate. On the other hand, however, the stream of fluid which turns round the exhauster by following the direction shown by the arrow B, creates at the outer end of nozzles provided between the boxes 1, 2, 3 and 4 of the exhauster, a decreased pressure which is transmitted inside such exhauster and causes a flow of air or other fluid to take place from the front part to the rear part of said exhauster, thereby crossing the stationary wheel 10 and rotating wheel 11 and said nozzles. Such stream or draught is rendered more intense in proportion to the lessening of the pressure in the region of the rear of the exhauster and consequently in proportion to the increase in speed of the flow of fluid.

The stationary wheel 10 which directs the streams of fluid causes the same to strike the blades of the rotating wheel 11 and to rotate the same. The action of the fluid is thus a double one, such fluid acting on the one hand due to its live force given to it by its initial speed, and on the other hand, due to the suction created at the external mouth of the nozzles by the same draught. It results that the speed of rotation of the apparatus is very high and especially, is much higher than that of the apparatuses which use only the first part of the motive power contained in the fluid, that is to say only its "live" force.

The use of the motive power gathered on the rotating wheel is obtained by means of the transmission through bevel gears shown in Fig. 1. The vertical shaft could directly operate a dynamo electric machine or a centrifugal pump.

Fig. 2 shows a modification of the motor in which the exhauster is constituted by means of straight boxes 38 triangular in cross section and connected so as to constitute a cylinder or drum provided with nozzles 39 which converge outwardly. Located on the foot of the exhauster is the rotating wheel 40 connected with a vertical shaft 41 which crosses said exhauster. Located under such rotating wheel is a stationary wheel 42 which acts as a distributor. The whole device is provided at its lower end with a canal or duct 43 the convenient orientation of which is obtained by means of a rudder 44. Shaft 41 rotates in bearings 45, 46, provided on the motor itself and on the base 37 respectively.

The exhauster constituted by the vertical drum provided with above mentioned nozzles towards the outer end of which the stream of fluid is directed as shown by the arrow C, produces a decrease in pressure which is transmitted inside the drum and causes the fluid to be exhausted or sucked through the canal 43. Such stream still crosses the stationary wheel 42 and the rotating wheel 40 which is actuated as in the device previously described.

Due to the presence of the rudder 44 the mouth of the canal 43 is always in the direction of the stream of fluid and thus may use the main "live" force of such stream of fluid, but it is obvious that such mouth could be directed in any desired direction, under the condition of course, that no exhaust could take place, as it could occur for instance if such mouth were in a direction opposed to the one shown in Fig. 2 for the same direction of the draught of fluid. In particular the canal 43 could be connected with a room not receiving a draught of fluid, the turbine thus being actuated only by the displacement of fluid which would be caused by the decrease of pressure in the exhauster.

In Fig. 4 is shown another embodiment of exhauster. The latter is constituted by boxes 47, 48, 49 which are connected in such a manner that the external shape of the whole device thus constituted favours the formation of a decrease of pressure at the outer end of nozzles 50, 51, 52 which are provided between the boxes.

The motor according to my invention could operate in a stream of any fluid such for instance, as steam, water, air, etc.; the suction produced by the exhauster or sucker being independent of the character of the surrounding fluid and controlled only by the speed of said stream.

This invention is to be applied to motors which use the live force of a stream of fluid, whatever may be the power of said motor and for any application.

What I claim is:—

1. A motor operated by a fluid stream, comprising a rotatable member adapted to be driven by the fluid stream, a stationary distributor for directing the fluid stream onto the rotatable member, a sucking or exhausting device consisting of a plurality of spaced, hollow boxes, having substantially triangular cross-sections, and forming between them internal nozzles converging outwardly and opening on the periphery of the exhausting device, said rotatable member being disposed adjacent the exhausting device in such manner as to utilize the action of the displacement of fluid caused by the decrease in pressure produced inside said exhausting device when it is surrounded by a stream of fluid, said stream of fluid also directly influencing said rotatable member.

2. A motor operated by a fluid stream, comprising a rotatable member adapted to be driven by the fluid stream, a stationary distributor for directing the fluid stream onto the rotatable member, a sucking or exhausting device externally shaped as a solid of revolution, and consisting of a plurality of spaced, toroidal-shaped hollow boxes, substantially triangular in cross-section, and forming between them internal nozzles converging outwardly and opening on the periphery of the exhausting device, said rotatable member being disposed adjacent the exhausting device in such manner as to utilize the action of the displacement of fluid caused by the decrease in pressure produced inside said exhausting device when it is surrounded by a stream of fluid, said stream of fluid also directly influencing said rotatable member.

3. A constructional form of the motor according to claim 1, in which the exhauster is constituted by straight boxes connected together to have externally the shape of a circular drum, the rotatable member being disposed at the bottom of such drum, a collector being provided, together with a rudder for maintaining its opening in the direction of the stream of fluid and terminating at the base of the exhauster whereby the fluid can act directly on the turbine.

FRÉDÉRIC FERRAL.